United States Patent [19]
Uwabo et al.

[11] Patent Number: 5,822,157
[45] Date of Patent: Oct. 13, 1998

[54] MAGNETIC DATA RECORDING/REPRODUCING DEVICE WITH VOICE COIL MOTOR HAVING CENTER YOKE BACK YOKE WITH BENT PORTIONS AND PERMANENT MAGNET ARRANGED TO GENERATE MAGNETIC FIELDS

[75] Inventors: Tsuneo Uwabo; Yoshihiro Okano; Eiichi Yoneyama; Yoshinori Tangi, all of Atsugi, Japan

[73] Assignee: Mitsumi Electric Co., Ltd., Tokyo, Japan

[21] Appl. No.: 790,952

[22] Filed: Jan. 29, 1997

[30] Foreign Application Priority Data

| Jan. 31, 1996 | [JP] | Japan | 8-015838 |
| May 21, 1996 | [JP] | Japan | 8-125859 |
| May 27, 1996 | [JP] | Japan | 8-132417 |

[51] Int. Cl.⁶ .................................................. G11B 5/55
[52] U.S. Cl. ............................................................ 360/106
[58] Field of Search ............................................ 360/106

[56] References Cited

U.S. PATENT DOCUMENTS

| 5,138,605 | 8/1992 | Shtipelman | 360/106 |
| 5,585,981 | 12/1996 | Lee | 360/106 |
| 5,657,172 | 8/1997 | Shibata | 360/106 |

*Primary Examiner*—A. J. Heinz
*Attorney, Agent, or Firm*—Frishauf, Holtz, Goodman, Langer & Chick

[57] ABSTRACT

In a magnetic data recording/reproducing device comprising a voice coil motor for use in driving a carriage assembly having a magnetic head for recording and reproducing data on and from a disk-shaped magnetic recording medium, the voice coil motor comprises a pair of voice coils integrally arranged with the carriage assembly on both sides thereof and a pair of magnetic circuit devices for use in generating magnetic fields which intersect over electric currents flowing through the pair of voice coils. Each of the magnetic circuit devices comprises a center yoke passing through the voice coil and a back yoke having a main surface extending in parallel with the center yoke at a certain distance and being opposed to the center yoke. The back yoke has bent portions each of which is bent at a generally right angle. The bent portions are magnetically connected to the corresponding ends of the center yoke. A permanent magnet is fixed to the main surface of the back yoke.

14 Claims, 5 Drawing Sheets

MAGNETIC DATA RECORDING/ REPRODUCING DEVICE WITH VOICE COIL MOTOR HAVING CENTER YOKE BACK YOKE WITH BENT PORTIONS AND PERMANENT MAGNET ARRANGED TO GENERATE MAGNETIC FIELDS

BACKGROUND OF THE INVENTION

The present invention relates to a magnetic data recording/reproducing device for recording and reproducing data on and from a disk-shaped magnetic recording medium through a magnetic head. More specifically, the present invention relates to a magnetic data recording/reproducing device comprising a voice coil motor for use in driving a carriage assembly having a magnetic head mounted thereon in a radius direction relative to a magnetic recording medium.

As well known in the art, flexible disk drives are some type of magnetic data recording/reproducing device on which a flexible disk can be mounted for the purpose of recording and reproducing data. Flexible disks have recently been increased in storage capacity. Typical flexible disks have a storage capacity of 1–2 megabytes (hereinafter, referred to as a normal capacity). There have been developed flexible disks with a storage capacity of 128 megabytes (hereinafter, referred to as a large capacity). In response to this, flexible disk drives have also been developed that can be used with a flexible disk of the large capacity.

The flexible disk drives used with a flexible disk of the normal capacity is different in mechanism from those used with a flexible disk of the large capacity. One of the differences lies in structure of driving means for use in driving a carriage assembly having a magnetic head mounted thereon in a predetermined radius direction relative to a flexible disk mounted within the flexible disk drive. More specifically, the flexible disk drive for the normal-capacity flexible disk uses a stepping motor as the driving means. On the other hand, the flexible disk drive for the large-capacity flexible disk uses a linear motor such as a voice coil motor (VCM) as the driving means.

Now, the voice coil motor is described that is used as the driving means for the flexible disk drives used with the flexible disk of the large capacity. The voice coil motor comprises a pair of voice coils integrally assembled with the carriage assembly on both sides thereof, and a pair of magnetic circuit devices for use in generating a magnetic field to be crossed over (i.e., intersecting with) electric current flowing through the pair of voice coils.

Hereinafter, the description will be made with regard to one of the pair of magnetic circuit devices. The magnetic circuit device typically comprises a permanent magnet polarized along the thickness thereof and a yoke member. The yoke member comprises a center yoke, a back yoke, and a pair of side yokes. The center yoke extends in the direction along which the carriage assembly moves and passes through the voice coil. The back yoke has a main surface extending in parallel with the center yoke at a certain distance and being opposed to the center yoke. The pair of side yokes are for magnetically connecting both ends of the center yoke with corresponding ends of the back yoke. The permanent magnet is fixed to the main surface of the back yoke. The center yoke, the back yoke, and the side yokes are each made of a steel plate having a thickness of at least 3 mm.

The magnetic circuit device produces the magnetic field across a space between the center yoke and the back yoke. Electric current flows through the voice coil in the direction crossing over the magnetic field. The interaction between the electric current and the magnetic field produces a driving force on the voice coil in the extending direction of the center yoke, that is, a driving direction. The voice coil motor can thus move the carriage assembly with the driving force in the driving direction.

The magnetic circuit device for the conventional voice coil motor comprises the yoke member consisting of the center yoke, the back yoke, and the pair of side yokes. The yoke member is thus formed of the relatively large number of components.

The permanent magnet, the center yoke, the back yoke, and the pair of side yokes are equal in width in the conventional magnetic circuit device. As described above, the voice coil motor generates the driving force by means of the interaction between the electric current flowing through the voice coil and the magnetic field produced by the magnetic circuit device. The driving force depends on the magnitude of the electric current and the number of magnetic fluxes across the voice coil. For a larger driving force, it is necessary either to increase the electric current flowing through the voice coil or to increase the number of the magnetic fluxes across the voice coil. There is, however, a limitation on the electric current flowing through the voice coil. On the other hand, the magnetic field over the voice coil, i.e., the number of the magnetic fluxes can only be increased with a permanent magnet made of an advanced magnetic material or with a larger width between the permanent magnet and the center yoke, the back yoke, and the pair of side yokes.

The permanent magnet made of the advanced magnetic material, if used, increases the price of the resultant voice coil motor. The larger width between the permanent magnet and the center yoke, the back yoke, and the pair of side yokes increases the size and dimension of the resultant voice coil motor.

SUMMARY OF THE INVENTION

Therefore, an object of the present invention is to provide a magnetic data recording/reproducing device comprising a voice coil motor having a magnetic circuit device with which the number of the components for the yoke member can be reduced.

Another object of the present invention is to provide a magnetic data recording/reproducing device comprising a cost-effective, small voice coil motor capable of providing a sufficient driving force.

The present invention is applicable to a magnetic data recording/reproducing device comprising a voice coil motor for use in driving a carriage assembly having a magnetic head mounted thereon for recording and reproducing data on and from a disk-shaped magnetic recording medium, in a predetermined radius direction relative to the magnetic recording medium.

According to an aspect of the present invention, the voice coil motor comprises a pair of voice coils integrally assembled with a carriage assembly on both sides thereof, and a pair of magnetic circuit devices for use in generating magnetic fields which intersect electric currents flowing through the pair of voice coils. Each of the magnetic circuit devices comprises a center yoke, a back yoke, and a permanent magnet. The center yoke extends in a driving direction parallel to a predetermined radius direction and passes through the voice coil. The back yoke has a main surface extending in parallel with the center yoke at a certain distance and being opposed to the center yoke. The back yoke also has bent portions at both ends thereof each of which is bent at a generally right angle. Free ends of the bent portions are magnetically connected to the corresponding ends of the center yoke. The permanent magnet is fixed to the main surface of the back yoke.

DESCRIPTION OF THE PREFERRED EMBODIMENT

Figure 1:
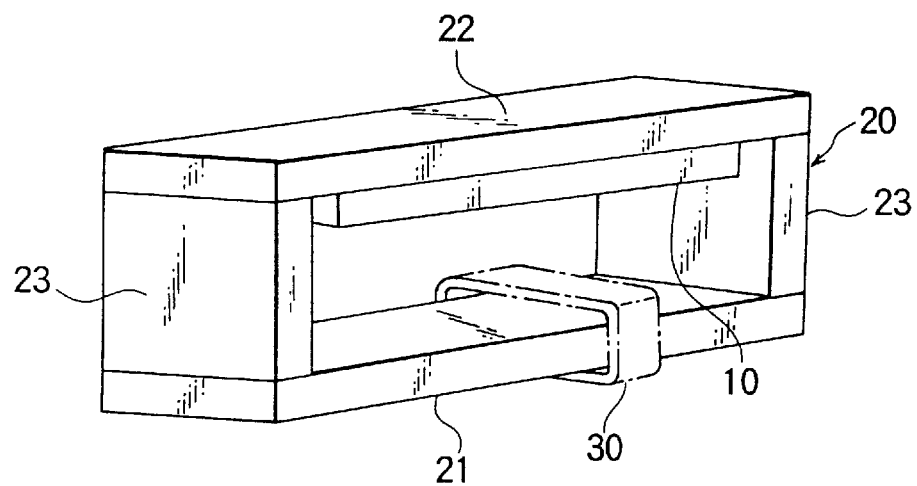
FIG. 1 is a perspective view of a magnetic circuit device for a conventional voice coil motor.

First, a magnetic circuit device for a conventional voice coil motor is described with reference to FIG. 1, for the purpose of facilitating understanding of the present invention. This magnetic circuit device is one of a pair of magnetic circuit devices and comprises a permanent magnet 10 polarized along the thickness thereof and a yoke member 20. The yoke member 20 comprises a center yoke 21, a back yoke 22, and a pair of side yokes 23. The center yoke 21 extends in the direction along which a carriage assembly (not shown) moves and passes through a voice coil 30. The back yoke 22 has a main surface extending in parallel with the center yoke 21 at a certain distance and being opposed to the center yoke 21. The pair of side yokes 23 are for magnetically connecting both ends of the center yoke 21 with corresponding ends of the back yoke 22. The permanent magnet 10 is fixed to the main surface of the back yoke 22. The center yoke 21, the back yoke 22, and the side yokes 23 are each made of a steel plate having a thickness of at least 3 mm.

The magnetic circuit device produces a magnetic field across a space between the center yoke 21 and the back yoke 22. Electric current flows through the voice coil 30 in the direction crossing over (i.e., intersecting with) the magnetic field. The interaction between the electric current and the magnetic field produces a driving force on the voice coil 30 in the extending direction of the center yoke 21, that is, a driving direction. The voice coil motor can thus move the carriage assembly with the driving force in the driving direction.

The magnetic circuit device for the conventional voice coil motor shown in FIG. 1 comprises the yoke member 20 consisting of the center yoke 21, the back yoke 22, and the pair of side yokes 23. The yoke member 20 is thus formed of a relatively large number of components.

As apparent from FIG. 1, the permanent magnet 10, the center yoke 21, the back yoke 22, and the pair of side yokes 23 are equal in width. As described above, the voice coil motor generates the driving force by means of the interaction between the electric current flowing through the voice coil 30 and the magnetic field produced by the magnetic circuit device. The driving force depends on the magnitude of the electric current and the number of magnetic fluxes across the voice coil 30. For a larger driving force, it is necessary either to increase the electric current flowing through the voice coil 30 or to increase the number of the magnetic fluxes across the voice coil 30. There is, however, a limitation on the electric current to be flown through the voice coil 30. On the other hand, the magnetic field over the voice coil 30, i.e., the number of the magnetic fluxes can only be increased with a permanent magnet 10 made of an advanced magnetic material or with a larger width between the permanent magnet 10 and the center yoke 21, the back yoke 22, and the pair of side yokes 23.

The permanent magnet 10 made of the advanced magnetic material, if used, increases the price of the resultant voice coil motor. The larger width between the permanent magnet 10 and the center yoke 21, the back yoke 22, and the pair of side yokes 23 increases the size and dimension of the resultant voice coil motor.

Figure 2:
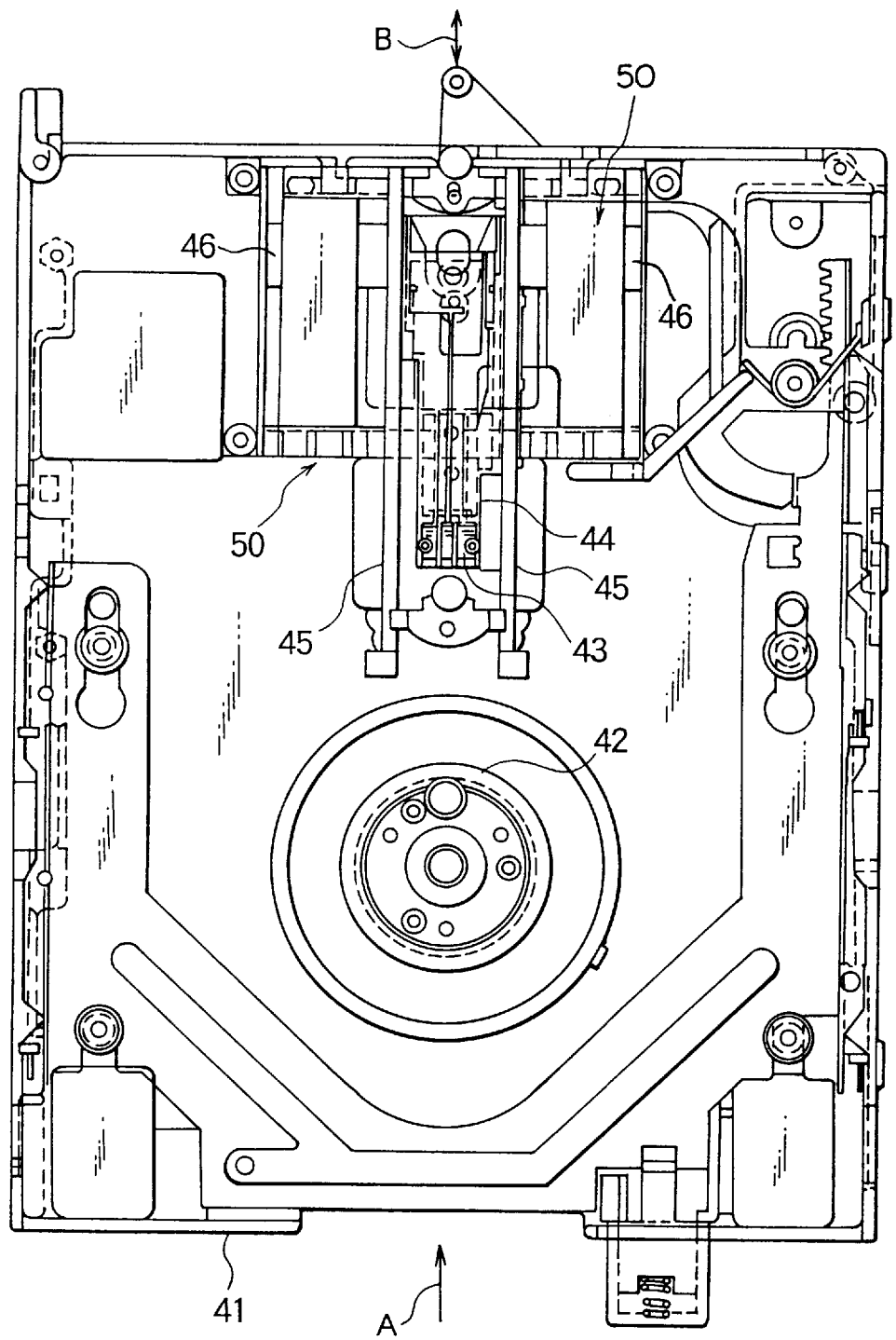
FIG. 2 is a plan view illustrating internal structure of a flexible disk drive to which a voice coil motor according to the present invention is applied.

With reference to FIG. 2, a magnetic data recording/reproducing device is described to which a voice coil motor according to the present invention is applied. The magnetic data recording/reproducing device is a flexible disk drive (FDD) on which a flexible disk (not shown) of a normal capacity or a large capacity can be mounted for the purpose of recording and reproducing data. The flexible disk is inserted into the flexible disk drive from the direction indicated by an arrow A in FIG. 2. The flexible disk inserted is held by a disk table assembly 42 which is rotatably supported on a main frame 41. The disk table assembly 42 is rotated by a disk drive motor (not shown) provided on a back surface of the main frame 41. The flexible disk is rotated in response to rotation of the disk drive motor. The main frame 41 is also provided with, on the back surface thereof, a printed wire board (not shown) where a number of electronic parts are mounted.

The flexible disk drive comprises a magnetic head (not shown) for recording and reproducing data on and from the flexible disk. The magnetic head is supported by the carriage 44 through a gimbal plate 43. A combination of the gimbal plate 43 and a carriage 44 is called a carriage assembly. The carriage 44 is positioned over the main frame 41 at a distance from the main frame 41. The carriage 44 holds the magnetic head such that the carriage 44 can move the magnetic head in a predetermined radius direction (depicted by an arrow B in FIG. 2) relative to the flexible disk. As described later, the carriage 44 is supported and guided at both sides thereof by a pair of guide bars 45 extending in the predetermined radius direction B.

The carriage 44 is driven in the predetermined radius direction B by a voice coil motor described more in detail below. The voice coil motor is positioned at a rear portion of the magnetic data recording/reproducing device. The voice coil motor comprises a pair of voice coils 46, and a pair of magnetic circuit devices 50 for use in generating a magnetic field to be crossed over electric current flowing through the voice coils 46.

Figure 3:
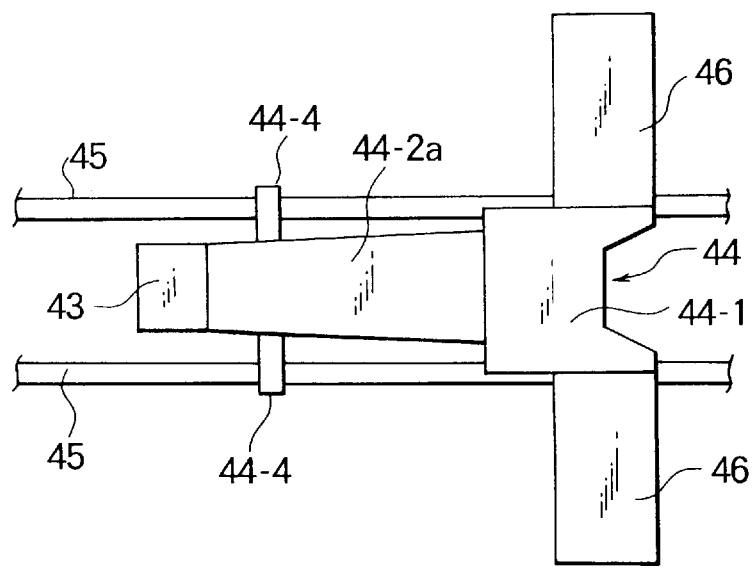
FIG. 3 is a plan view illustrating schematic structure of a carriage assembly in FIG. 2.
Figure 4:
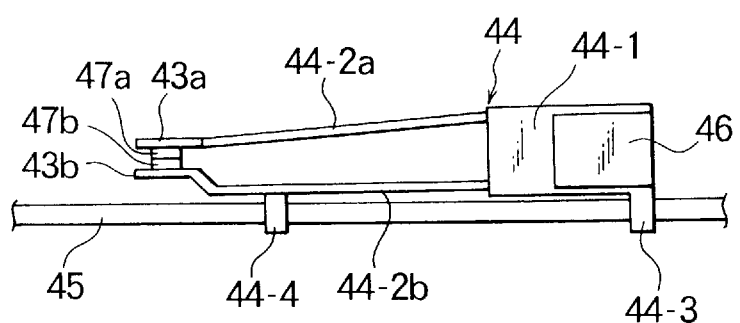
FIG. 4 is a side view of the carriage assembly in FIG. 3.

Referring also to FIGS. 3 and 4, the carriage assembly is described briefly. The carriage assembly comprises a carriage body 44-1, an upper carriage 44-2a, a lower carriage 44-2b, an upper gimbal plate 43a provided at the tip of the upper carriage 44-2a, and a lower gimbal plate 43b provided at the tip of the lower carriage 44-2b. The pair of voice coils 46 are integrally assembled with the carriage body 44-1 on both sides thereof. The upper and lower gimbal plates 43a and 43b hold an upper magnetic head 47a and a lower magnetic head 47b, respectively. Projected members 44-3 are provided on both sides of the carriage body 44-1 at a lower portion thereof. The guide bar 45 is passing through the projected members 44-3. Likewise, projected members 44-4 are provided both sides of the lower carriage 44-2b with the guide bar 45 passing therethrough. The upper carriage 44-2a is rotatable in a vertical direction about the joint with the carriage body 44-1, a description of which structure is omitted here.

Referring to FIGS. 2 and 5 through 8, a preferred embodiment of the present invention is described. The magnetic circuit device 50 comprises a permanent magnet 51 polarized along the thickness thereof and a yoke member. The yoke member comprises a center yoke 52 and a back yoke 53. The center yoke 52 extends in the direction along which the carriage assembly moves and passes through the voice coil 46. The back yoke 53 has a main surface 53a extending in parallel with the center yoke 52 at a certain distance and being opposed to the center yoke 52. The back yoke 53 has end portions 53b each of which is bent at a generally right angle by means of press working. The end portions 53b are magnetically connected to the corresponding ends of the center yoke 52. The permanent magnet 51 is fixed to the main surface 53a of the back yoke 53. The center yoke 52 and the back yoke 53 are each made of a steel plate having a thickness of at least 3 mm.

The center yoke 52, the back yoke 53, the permanent magnet 51 have a center yoke width Wc, a back yoke width Wb, and a magnet width Wm (Wm is not illustrated in FIG. 5), respectively. The magnet width Wm and the back yoke width Wb are each larger than the center yoke width Wc. In this embodiment, the magnet width Wm is equal to the back yoke width Wb.

Figure 6:
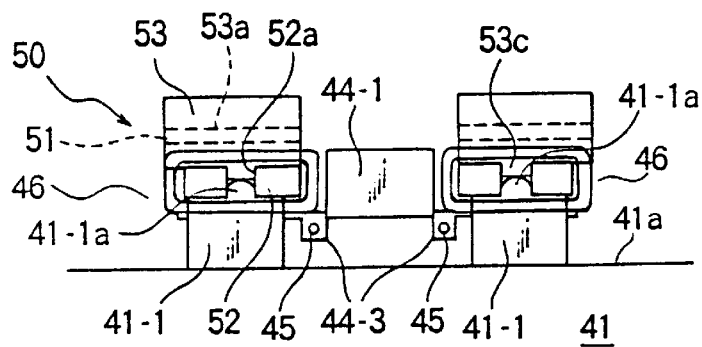
FIG. 6 is a front view partially illustrating a voice coil motor according to the present invention.

As shown in FIG. 6, the main frame 41 has four pedestals 41-1 (only two of which are illustrated) for use in arranging the magnetic circuit device 50 to be apart from a main surface 41a of the main frame 41. Each pedestal 41-1 has a projected member 41-1a which is projected upward from the pedestal 41-1. The height of the projected member 41-1a is smaller than the thickness of the center yoke 52. The center yoke 52 has notches 52a formed in both ends thereof which the corresponding projected members 41-1a are engaged with. The projected members 41-1a of the pedestal 41 thus serve to position the center yoke 52. The back yoke 53 is provided with projections 53c formed on both ends 53b of the back yoke 53. The projections 53c are engaged with the corresponding notches 52a. The height of the projections 53c is approximately equal to the difference obtained by means of subtracting the height of the projected member 41-1a from the height of the center yoke 52. The notches 52a in the center yoke 52 serve to position the back yoke 53.

In the voice coil motor having the structure as described above, the permanent magnet 51 produces a magnetic field across the space between the center yoke 52 and the back yoke 53. By passing the current through the voice coil 46 in the direction crossing over the magnetic field, the driving force acts on the voice coil 46 due to the interaction between the electric current and the magnetic field, which the driving force acts in the direction along with the center yoke 52 extends, i.e., the driving direction. This driving force allows the voice coil 46 to move the carriage assembly in the predetermined radius direction B.

The magnetic fields acts on the voice coil 46 effectively because Wm=Wb>Wc as mentioned above. In other words, if the back yoke 53 has the back yoke width Wb equal to that of the back yoke in the conventional magnetic circuit device, the number of the magnetic fluxes across the voice coil 46 is substantially larger than that in the conventional magnetic circuit device by keeping the relation Wm=Wb>Wc, and the driving force of the voice coil motor increases. Accordingly, it becomes possible to provide a cost-effective, small voice coil motor with less components that is capable of providing a sufficient driving force.

Figure 7:
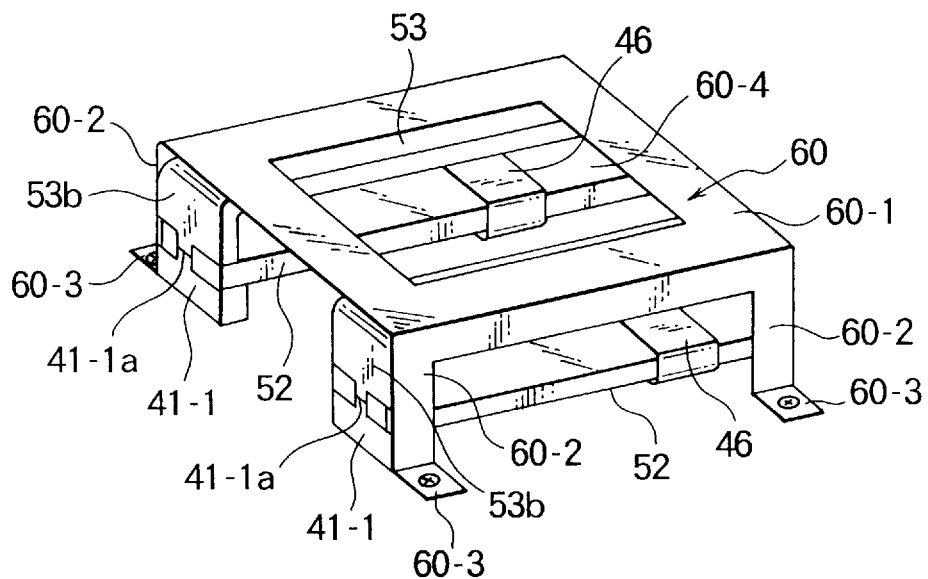
FIG. 7 is a perspective view of a magnetic circuit device for the voice coil motor according to the present invention.
Figure 8:
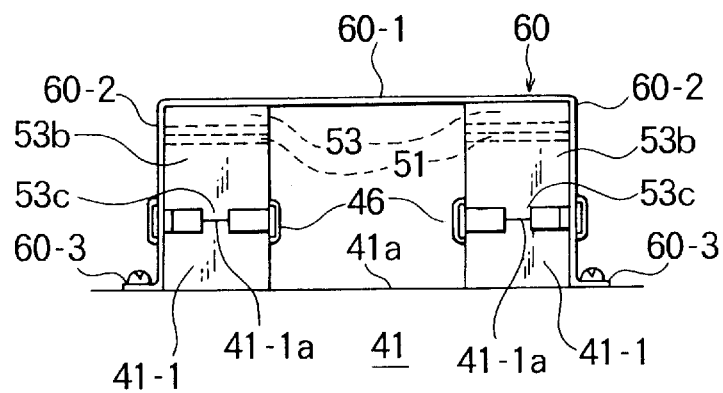
FIG. 8 is a front view of the magnetic circuit device in FIG. 7.

In FIGS. 7 and 8, the device according to the present invention comprises a cover plate 60 to be used to fix the pair of magnetic circuit devices to the main flame 41. The cover plate 60 comprises a main plate 60-1, leg members 60-2, and fixing portions 60-3. The main plate 60-1 is for urging the two back yokes 53 from upward. The leg members 60-2 are extended downward from the main plate 60-1 at four corners thereof. The fixing portions 60-3 are formed at the lower end of the respective leg members 60-2 to fix the cover plate 60 to the main frame 41 with screws. The fixing portions 60-3 are each formed by means of folding. The main plate 60-1 is provided with an opening 60-4 formed therein.

In particular, the fixing portions 60-3 are projected on the sides of the center yoke 52 or the back yoke 53. This allows a smaller dimension of the magnetic circuit device along the driving direction, which in turn reduces the front-to-back dimension or the depth of the magnetic data recording/reproducing device.

Figure 5:
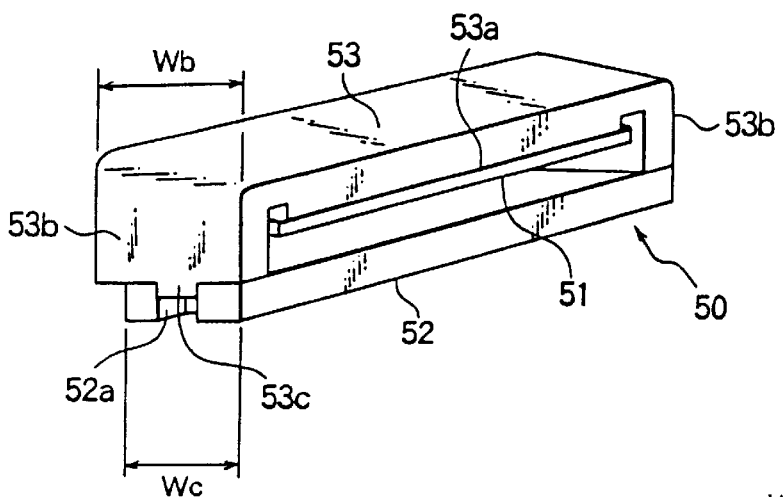
FIG. 5 is a perspective view of a magnetic circuit device for a voice coil motor according to the present invention.
Figure 5A:
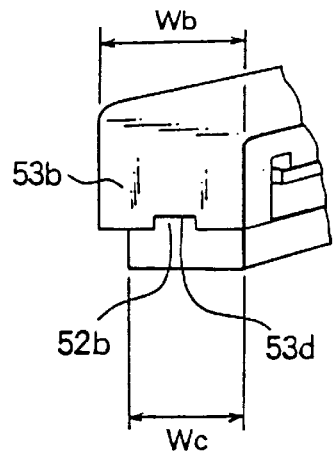
FIG. 5A is a partial perspective view, similar to FIG. 5, showing a modification of the arrangement shown in FIG. 5.

It is understood that the present invention is not limited to the above mentioned embodiment and various changes and modifications can be made without departing from the scope and spirit of the present invention. For example, while the present invention has been described in conjunction with the flexible disk drive to which it is applied, it is applicable to other types of magnetic data recording/reproducing devices. In FIG. 5, although the end portions 53b are provided with the projections 53c, the end portions 53b may be provided with notches 53d as shown in FIG. 5A. In this case, also as shown in FIG. 5A the center yoke 52 is provided with projections 52b formed on both ends thereof and engaged with the corresponding notches.

What is claimed is:

1. A magnetic data recording/reproducing device comprising a voice coil motor for use in driving a carriage assembly having a magnetic head mounted thereon for recording and reproducing data on and from a disk-shaped magnetic recording medium, the carriage assembly being driven in a predetermined radius direction relative to the magnetic recording medium, the voice coil motor comprising:
a pair of voice coils integrally arranged with the carriage assembly on both sides of the carriage assembly; and
a pair of magnetic circuit devices arranged to generate magnetic fields which intersect with electric currents flowing through the pair of voice coils, wherein each of the magnetic circuit devices comprises:
a center yoke extending along a driving direction parallel to the predetermined radius direction and passing through the voice coil;
a back yoke having a main surface extending in parallel with the center yoke at a certain distance from the center yoke and being opposed to the center yoke, the back yoke having bent portions each of which is bent at a generally right angle, the bent portions being magnetically connected to corresponding ends of the center yoke; and a permanent magnet fixed to the main surface of the back yoke; and wherein the center yoke, the back yoke and the permanent magnet have a center yoke width Wc, a back yoke width Wb, and a magnet width Wm, respectively, the magnet width Wm and the back yoke width Wb being larger than the center yoke width Wc.

2. A magnetic data recording/reproducing device as claimed in claim 1, wherein:

the bent portions of the back yoke have respective projections thereon at ends of the bent portions; and the center yoke has notches formed at both ends thereof, which notches are engaged with corresponding projections of the bent portions.

3. A magnetic data recording/reproducing device as claimed in claim 1, wherein the magnet width Wm is equal to the back yoke width Wb.

4. A magnetic data recording/reproducing device as claimed in claim 3, wherein:

the bent portions of the back yoke have respective notches formed therein at ends of the bent portions; and the center yoke has projections on both ends thereof, which projections are engaged with corresponding notches of the bent portions.

5. A magnetic data recording/reproducing device as claimed in claim 3, wherein:

the bent portions of the back yoke have respective projections thereon at ends of the bent portions; and the center yoke has notches formed at both ends thereof, which notches are engaged with corresponding projections of the bent portions.

6. A magnetic data recording/reproducing device as claimed in claim 3, wherein the bent portions of the back yoke are bent by press working.

7. A magnetic data recording/reproducing device as claimed in claim 6, wherein:

the bent portions of the back yoke have respective notches formed therein at ends of the bent portions; and the center yoke has projections on both ends thereof, which projections are engaged with corresponding notches of the bent portions.

8. A magnetic data recording/reproducing device as claimed in claim 6, wherein:

the bent portions of the back yoke have respective projections thereon at ends of the bent portions; and the center yoke has notches formed at both ends thereof, which notches are engaged with corresponding projections of the bent portions.

9. A magnetic data recording/reproducing device as claimed in claim 6, wherein the center yoke and the back yoke each have a thickness of 3 mm or larger.

10. A magnetic data recording/reproducing device as claimed in claim 9, wherein:

the bent portions of the back yoke have respective notches formed therein at ends of the bent portions; and the center yoke has projections on both ends thereof, which projections are engaged with corresponding notches of the bent portions.

11. A magnetic data recording/reproducing device as claimed in claim 9, wherein:

the bent portions of the back yoke have respective projections thereon at ends of the bent portions; and the center yoke has notches formed at both ends thereof, which notches are engaged with corresponding projections of the bent portions.

12. A magnetic data recording/reproducing device as claimed in claim 1, wherein:

the bent portions of the back yoke have respective notches formed therein at ends of the bent portions; and the center yoke has projections on both ends thereof, which projections are engaged with corresponding notches of the bent portions.

13. A magnetic data recording/reproducing device as claimed in claim 1, wherein the magnetic data recording/reproducing device further comprises a main frame and a cover plate fixed to the main frame by screws, the cover plate urging the combination of the center yoke and the back yoke from upward onto the main frame.

14. A magnetic data recording/reproducing device as claimed in claim 13, wherein the cover plate is fixed to the main frame by the screws which are located at sides of the back yoke and the center yoke.

* * * * *